(12) United States Patent
Chern

(10) Patent No.: US 11,114,140 B1
(45) Date of Patent: Sep. 7, 2021

(54) ONE TIME PROGRAMMABLE (OTP) BITS FOR PHYSICALLY UNCLONABLE FUNCTIONS

(71) Applicant: HeFeChip Corporation Limited, Sai Ying Pun (HK)

(72) Inventor: Geeng-Chuan Chern, Cupertino, CA (US)

(73) Assignee: HeFeChip Corporation Limited, Sai Ying Pun (HK)

( * ) Notice: Subject to any disclaimer, the term of this patent is extended or adjusted under 35 U.S.C. 154(b) by 0 days.

(21) Appl. No.: 16/856,055

(22) Filed: Apr. 23, 2020

(51) Int. Cl.
G11C 7/12 (2006.01)
G11C 7/18 (2006.01)
G11C 7/10 (2006.01)
G11C 16/04 (2006.01)
H04L 9/32 (2006.01)
G11C 16/30 (2006.01)

(52) U.S. Cl.
CPC .............. G11C 7/12 (2013.01); G11C 7/1045 (2013.01); G11C 7/18 (2013.01); G11C 16/0408 (2013.01); G11C 16/30 (2013.01); H04L 9/3278 (2013.01); *H04L 2209/12* (2013.01)

(58) Field of Classification Search
CPC ..... G11C 7/12; G11C 16/0408; G11C 7/1045; G11C 7/18; G11C 16/30; H04L 9/3278; H04L 2209/12
See application file for complete search history.

(56) References Cited

U.S. PATENT DOCUMENTS

| | | |
|---|---|---|
| 3,423,646 A | 1/1969 | Cubert |
| 3,634,929 A | 1/1972 | Yoshida |
| 4,322,822 A | 3/1982 | McPherson |
| 4,507,757 A | 3/1985 | McElroy |
| 4,682,404 A | 7/1987 | Miller |
| 4,728,617 A | 3/1988 | Woo |
| 4,757,026 A | 7/1988 | Woo |
| 4,784,965 A | 11/1988 | Woo |
| 4,823,181 A | 4/1989 | Mohsen |
| 4,855,247 A | 8/1989 | Ma |
| 4,975,385 A | 12/1990 | Beinglass |
| 5,019,878 A | 5/1991 | Yang |
| 5,025,494 A | 6/1991 | Gill |
| 5,314,834 A | 5/1994 | Mazur |
| 5,672,994 A | 9/1997 | Au |

(Continued)

FOREIGN PATENT DOCUMENTS

| | | |
|---|---|---|
| EP | 3 270 539 A1 | 1/2018 |
| JP | 11-274313 A | 10/1999 |

OTHER PUBLICATIONS

Liu, Zhen, & Sun. Gate-Oxide-Breakdown Antifuse OTP ROM Array Based on TSMC 90nm Process, 2015 International Symposium on Next-Generation Electronics (ISNE) (pp. 1-3) (Year: 2015).*

(Continued)

*Primary Examiner* — Ajay Ojha
(74) *Attorney, Agent, or Firm* — Winston Hsu

(57) ABSTRACT

A semiconductor device includes at least a one-time programmable (OTP) physically unclonable function (PUF) unit cell with the PUF unit cell coupled to a bit line and a source line and includes an encode transistor is proposed. An encode enable transistor directly couples the bit line and the source line. A path programming the encode transistor is different from a path reading the encode transistor.

17 Claims, 3 Drawing Sheets

(56) References Cited

U.S. PATENT DOCUMENTS

| | | | |
|---|---|---|---|
| 5,837,588 | A | 11/1998 | Wu |
| 6,010,954 | A | 1/2000 | Ho |
| 6,025,635 | A | 2/2000 | Krivokapic |
| 6,097,070 | A | 8/2000 | Mandelman |
| 6,225,669 | B1 | 5/2001 | Long |
| 6,258,641 | B1 | 7/2001 | Wong |
| 6,580,145 | B2 | 6/2003 | Wu |
| 6,597,234 | B2 | 7/2003 | Reber |
| 6,844,252 | B2 | 1/2005 | Pan |
| 6,888,205 | B2 | 5/2005 | Moscatelli |
| 6,933,554 | B1 | 8/2005 | Han |
| 7,002,219 | B1 | 2/2006 | de Jong |
| 7,102,910 | B2 | 9/2006 | Pham |
| 7,141,862 | B2 | 11/2006 | Noda |
| 7,220,649 | B2 | 5/2007 | Nakamura |
| 7,402,855 | B2 | 7/2008 | Kurjanowicz |
| 8,026,133 | B2 | 9/2011 | Ozawa |
| 8,213,211 | B2 | 7/2012 | Kurjanowicz |
| 8,237,224 | B2 | 8/2012 | Nakamura |
| 8,324,042 | B2 | 12/2012 | Cai |
| 8,471,355 | B2 | 6/2013 | Kurjanowicz |
| 9,281,074 | B2 | 3/2016 | Wu |
| 9,583,612 | B1 | 2/2017 | Edwards |
| 9,741,850 | B1 | 8/2017 | Hsiao |
| 10,163,783 | B1 * | 12/2018 | Chang ............... G11C 17/16 |
| 10,181,357 | B2 | 1/2019 | Wong |
| 10,276,679 | B2 | 4/2019 | Chiu |
| 10,361,296 | B2 | 7/2019 | Matocha |
| 10,529,812 | B1 | 1/2020 | Edwards |
| 10,964,738 | B2 | 3/2021 | Chen |
| 11,043,483 | B2 | 6/2021 | Hwang |
| 2002/0197810 | A1 | 12/2002 | Hanafi |
| 2004/0048876 | A1 | 3/2004 | Busch |
| 2004/0150066 | A1 | 8/2004 | Inoue |
| 2005/0029616 | A1 | 2/2005 | Noda |
| 2006/0102928 | A1 | 5/2006 | Nakamura |
| 2007/0164328 | A1 | 7/2007 | Nakamura |
| 2009/0053885 | A1 | 2/2009 | Sakamoto |
| 2009/0146220 | A1 | 6/2009 | Yoo |
| 2010/0214008 | A1 | 8/2010 | Li |
| 2013/0039117 | A1 * | 2/2013 | Lin ............... G11C 17/18 365/96 |
| 2015/0061011 | A1 | 3/2015 | Cheng |
| 2016/0027899 | A1 | 1/2016 | Kim |
| 2016/0104542 | A1 * | 4/2016 | Wu ............... G11C 16/10 365/96 |
| 2017/0018612 | A1 | 1/2017 | Ito |
| 2017/0200650 | A1 | 7/2017 | Chang |
| 2017/0263766 | A1 | 9/2017 | Xia |
| 2017/0301406 | A1 | 10/2017 | Wong |
| 2018/0013421 | A1 | 1/2018 | Park |
| 2018/0158738 | A1 | 6/2018 | Chang |
| 2019/0019866 | A1 | 1/2019 | Kim |
| 2019/0027228 | A1 | 1/2019 | Hsu |
| 2020/0091285 | A1 | 3/2020 | Hafez |
| 2021/0020519 | A1 | 1/2021 | Wang |

OTHER PUBLICATIONS

Chern, the specification, including the claims, and drawings in the U.S. Appl. No. 16/876,092, filed May 17, 2020.
Chern, the specification, including the claims, and drawings in the U.S. Appl. No. 16/801,121, filed Feb. 25, 2020.
Chern, the specification, including the claims, and drawings in the U.S. Appl. No. 16/846,424, filed Apr. 13, 2020.

* cited by examiner

ONE TIME PROGRAMMABLE (OTP) BITS FOR PHYSICALLY UNCLONABLE FUNCTIONS

BACKGROUND OF THE INVENTION

1. Field of the Invention

This application relates to semiconductor device comprising at least a One Time Programmable (OTP) physically unclonable function (PUF) unit cell, wherein a path programming the unit cell is different from a path reading the unit cell.

2. Description of the Prior Art

For security purposes, modern electronic apparatuses, such as personal computers, smart phones, IC chip, etc., require certain identification means, similar to human fingerprint, eye cornea, etc. These means are desired to be Physically Unclonable Functions (PUF).

A PUF can be implemented in an array of one time programming (OTP) memory cells programmed with a predetermined bias voltage. To generate the PUF code, complicated steps including reading all the cell currents, determining a relationship between the cell currents and the cell counts, setting a reference current, comparing cell-by-cell current with the reference current, etc.

A 2-transistor (2T) bit with one select transistor and the other for encoding can also be used. Soft breakdown of oxide on top of either the source or drain of the encoding transistor is introduced by applied voltage or process plasma damage. Read out is based on the current through the gate oxide. For example, the Source-to-Gate current is higher than that of the Drain-to-Gate current if the soft breakdown occurs on the source side. The leakage current of the soft broken down oxide could be small. It is, thus, necessary to have a complicated sensing amplifier to compare the source side and drain side gate oxide leakage currents.

SUMMARY OF THE INVENTION

As a solution to the above-described prior art problems, a novel semiconductor device is proposed. The semiconductor device comprises at least a bit line and source line and at least a physically unclonable function (PUF) unit cell coupled to the bit line and the source line. A path programming the unit cell is different from a path reading the unit cell.

A method of programming a semiconductor device is also proposed. The semiconductor device comprises at least a bit line and source line and at least a physically unclonable function (PUF) unit cell. The PUF unit cell comprises an encode select transistor having a first terminal coupled to ground (GND), a second terminal coupled to a control terminal of an encode transistor, and a control terminal coupled to an encode select line. The encode transistor further includes a first terminal coupled to the source line, and a second terminal coupled to a first terminal of a read select transistor. The read select transistor further includes a second terminal coupled to the bit line, and a control terminal coupled to a read select line. The method comprises applying a voltage to the encode select line to turn on the encode select transistor, applying a voltage to the read select line to turn on the read select transistor, and applying enough voltage to the bit line and the source line simultaneously to cause a breakdown of gate dielectric on top of either a drain or a source of the encode transistor.

A method of reading a semiconductor device is also proposed. The semiconductor device comprises at least a bit line and source line and at least a physically unclonable function (PUF) unit cell. The PUF unit cell comprises an encode select transistor having a first terminal coupled to ground (GND), a second terminal coupled to a control terminal of an encode transistor, and a control terminal coupled to an encode select line. The encode transistor further includes a first terminal coupled to the source line, and a second terminal coupled to a first terminal of a read select transistor. The read select transistor further includes a second terminal coupled to the bit line and a control terminal coupled to a read select line. The method comprises applying a voltage to the encode select line to turn off the encode select transistor, electrically decoupling the bit line from the source line, and applying a voltage to the read select line to turn on the read select transistor.

These and other objectives of the present invention will no doubt become obvious to those of ordinary skill in the art after reading the following detailed description of the preferred embodiment that is illustrated in the various figures and drawings.

DETAILED DESCRIPTION

Realized by an array of OTP bits, the present invention utilizes the channel current, instead of gate leakage current, for read. This has a great advantage in that the state "1" bit current is the transistor "on" current that is consistently high without too much variation other than those caused by manufacture process fluctuation while the state "0" bit current is the very small transistor "off" current.

Figure 1:
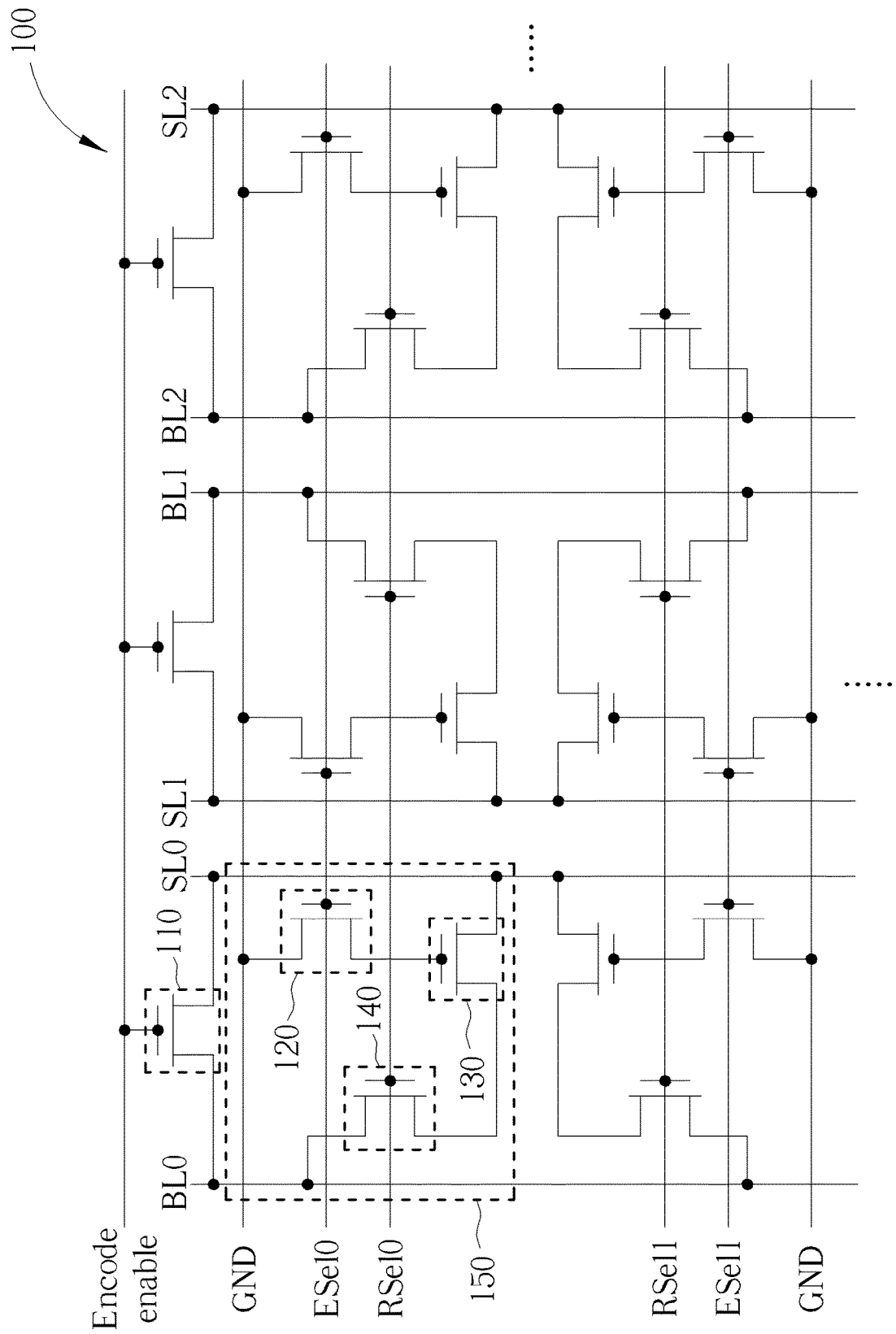
FIG. 1 illustrates an array 100 of OTP bit units 150 suitable for the proposed PUF.

FIG. 1 illustrates an array 100 of OTP bit units 150 suitable for the proposed PUF. As shown, the OTP bit units 150 are arranged in a plurality of intersecting rows and columns, with each column including a different bit line BL0-BLx, a different source line SL0-SLx, and a plurality of bit units 150. Each column of bit units 150 also includes an encode enable transistor 110; the encode enable transistor 110 having a first terminal coupled to the respective line BL0-BLx, a second terminal coupled to the respective source line SL0-SLx, and a control terminal coupled an encode enable line.

Using bit unit 150 in the upper left portion of FIG. 1 as an example, each bit unit 150 comprises a select transistor 120, an encode transistor 130, and a read transistor 140. The select transistor 120 includes a first terminal coupled to ground (GND), a second terminal coupled to a control terminal of the encode transistor 130, and a control terminal coupled to an encode select line ESel0-ESel1x, respectively. The encode transistor 130 further includes a first terminal coupled to a source line SL0-SLx, respectively, and a second terminal coupled to a first terminal of the read transistor 140. The read transistor 140 further includes a second terminal coupled to a bit line BL0-BLx, respectively, and a control terminal coupled to a read select line RSel0-RSelx, respectively. Each bit unit 150 in a column may be coupled to the same bit line BL0-BLx and to the same source line SL0-SLx, while each bit unit in a row may be coupled to the same select line ESel0-ESel1x and to the same read select line RSel0-RSelx.

Figure 2A:
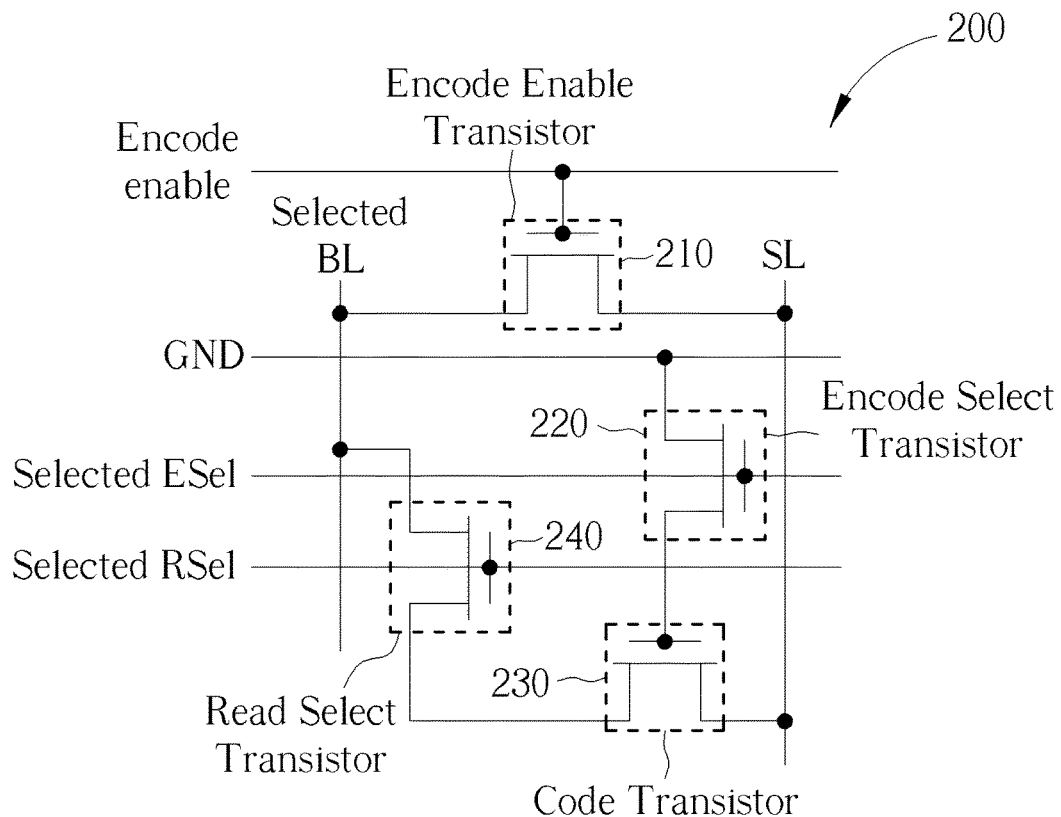
FIG. 2a illustrates a programming of selected bit unit for random encoding.

FIG. 2a illustrates a bit unit 200 similar to bit unit 150. Programming of selected bit unit 200 for random encoding includes the following steps.

(1) 1-3V is applied to the selected ESel line ESel0-ESel1x to turn on the encode select transistor 220.

(2) A high enough voltage is applied to the encode enable line coupled to the control terminal of the encode enable transistor 210 and to the selected RSel line RSel0-RSelx coupled to the control terminal of the read select transistor 240.

(3) All the unselected ESel lines ESel0-ESel1x and RSel lines RSel0-RSelx are connected to ground (0V).

(4) The P-Substrate is usually connected to ground (0V). For optional triple well structures, a Deep N-Well is connected to ground while the P-Well could be floating or connected to ground. (5) All the source lines SL0-SLx are floating, and unselected bit lines BL0-BLx are floating or connected to ground. There is no need to supply any voltage to the selected source line SL0-SLx since it is connected to the selected bit line BL0-BLx through the turned on encode enable transistor 210.

(6) Ramp up the selected bit line BL0-BLx voltage, preferred to be through a current limiter to prevent excessive damage, until a sudden increase in current and a sudden drop in voltage across gate oxide, indicating breakdown of gate oxide on top of either the drain or source of the encode transistor 230. Breakdown could also be caused by simply applying a voltage, higher than gate oxide breakdown voltage (BV), to the selected bit line BL0-BLx (also preferred to be through a current limiter to prevent excessive damage). After breakdown occurs at either the source or the drain side, the other side will be intact due to the drop in voltage across gate oxide. It is necessary to have source/drain junction BV higher than gate BV.

During the programming steps outlined above it is preferred to use the bias conditions shown in the following Table 1.

TABLE 1

Encoding Bias Conditions

| Terminal | Bias Voltage |
| --- | --- |
| Selected ESel | 1-3 V |
| Unselected ESel | 0 V |
| Encode enable line & Selected RSel | 3-10 V |
| Unselected RSel | 0 V |
| Selected BL | 3-10 V or Ramp up from 0 V to BV |
| Unselected BL | 0 V or Floating |
| All SL | Floating |
| P-Well | 0 V or Floating |
| Others | 0 V |

It is noted that all bit units 150/200 in a single row can be optionally randomly programed at the same time by connecting independent voltage supplies to all BL lines BL0-BLx, one supply for each BL line, at the same time to ramp up the voltage or apply a fix voltage to each BL line. This is due to all bit units 150/200 in a single row sharing a common ESel line and RSel line.

Figure 2B:
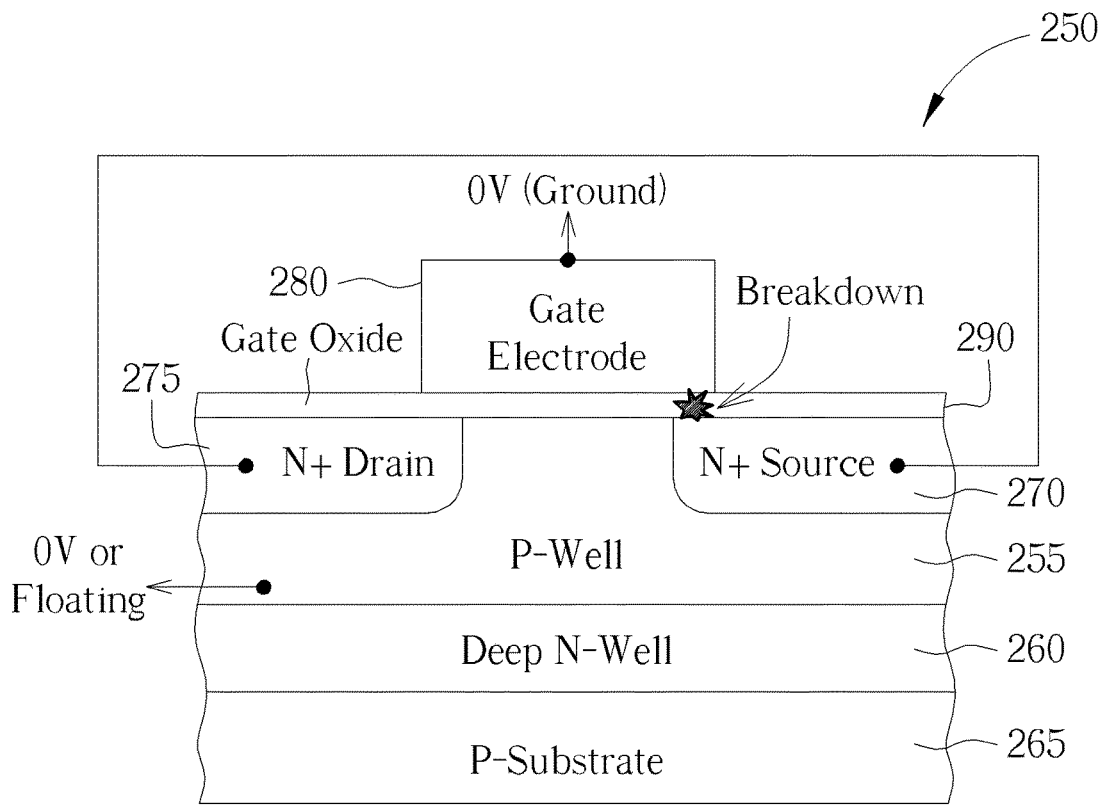
FIG. 2b illustrates an example encode transistor suitable for use in in all embodiments.

FIG. 2b illustrates an example encode transistor 250 suitable for use in in all embodiments. It is noted that encode transistor 250 is merely an example and another type of transistor that contains a gate oxide layer may be substituted without departing from the spirit of the invention. Encode transistor 250 includes N+ doped regions, representing the source region 270 and drain region 275 of the encode transistor 250, and an optional well structure formed on a P-substrate 265. The well structure may include a deep N-well 260 formed on the P-substrate 265, a P-well 255 formed on the deep N-well 260. A gate oxide layer 290 covers P-well 255, the source 270, and drain region 275. On top of the gate oxide layer is formed the gate electrode 280.

During programming steps 1-6 outlined above, the gate oxide 290 will breakdown between the gate electrode 280 and either the drain 275 or the source 270. FIG. 2A shows this breakdown occurring between the gate electrode 280 and the source 270, but the breakdown could have just as easily occurred between the gate electrode 280 and the drain 275 depending upon variations in the manufacturing process, resulting in a random programming result.

Figure 3A:
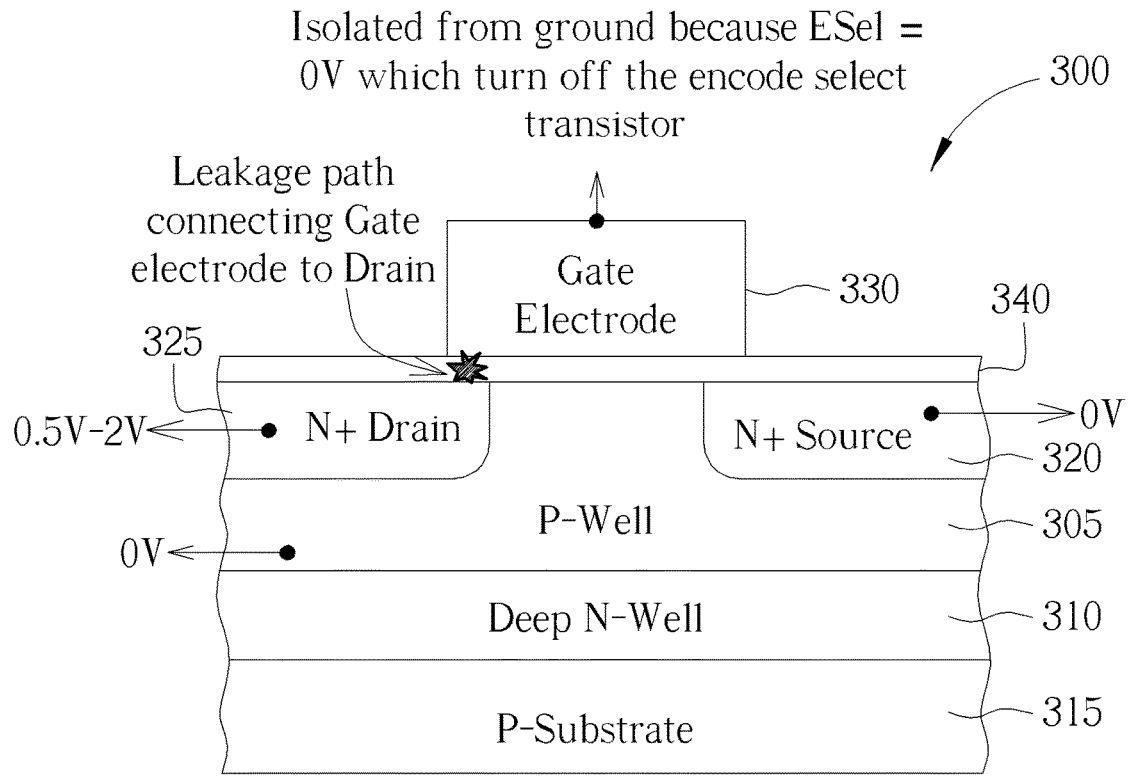
FIGS. 3A and 3B illustrate reading the encode transistor after programming.
Figure 3B:
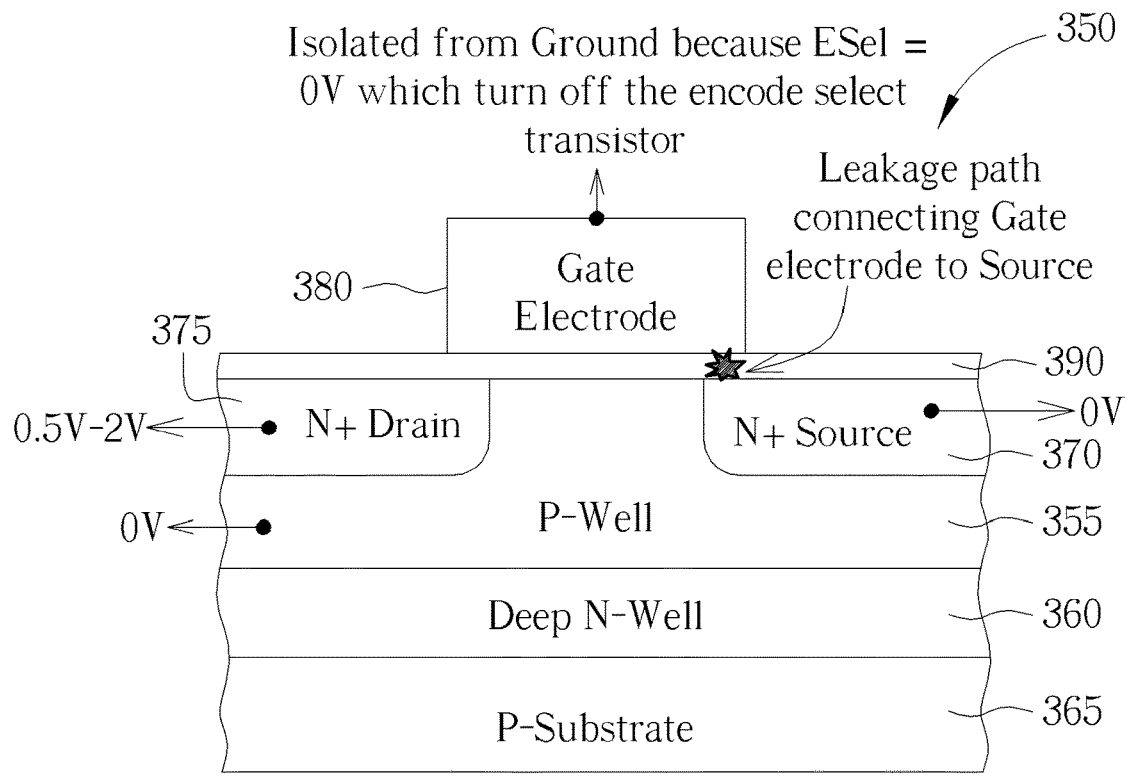

FIGS. 3A and 3B illustrate reading the encode transistor after programming as outlined above. In FIG. 3, encode transistor 300 is used as an example. As with other example embodiments, encode transistor 300 includes a deep N-well 310, a P-well 305, an N+ drain region 325, an N+ source region 320, a gate oxide layer 340, and a gate electrode 330 formed on a P-substrate 315.

To read the generated random code, bit-by-bit is selected with the following steps.

(1) 0V is applied to all the Esel lines ESel0-ESel1x to turn off all Encode select transistors 120/220 so that all gate electrodes of the encode transistors 130/230/250/300/350 are isolated from the outside bias. Therefore, voltage of the encode transistor Gate 330 will be the same as that of Drain 325 if the Gate oxide 340 breakdown, caused during the encoding procedure, is on the Drain 325 side, and the same as that of Source 320 if the Gate oxide 340 breakdown is on the Source 320 side.

(2) Encode enable line is 0V to turnoff all encode enable transistors 110 so that each BL BL0-BLx is isolated from each SL SL0-SLx.

(3) 1-3V is applied to the selected RSel line RSel0-RSelx to turn on the selected Read Select Transistor 140, 240 so that Drain 325 of the selected encode transistor 300 is connected to the selected BL line BL0-BLx to which 0.5-2V is applied.

(4) All the other terminals, including encode transistor Source 320, are applied with 0V.

The read bias conditions are summarized in the following Table

TABLE 2

Read Bias Conditions

| Terminal | Bias Voltage |
| --- | --- |
| All Esel ESel0-Eselx and Encode enable line | 0 V |
| Selected Rsel Rsel0-Rselx | 1-3 V |
| Unselected Rsel Rsel0-Rselx | 0 V |
| Selected BL BL0-BLx | 0.5-2 V |
| Unselected BL BL0-BLx | 0 V or Floating |
| All SL SL0-SLx | 0 V |
| P-Well | 0 V |
| Others | 0 V |

Under the bias conditions mentioned above, the encode transistor has a high channel current if the Gate oxide breakdown is on the Drain 325 side because the Gate 330 voltage is high, or the same as Drain 325 voltage, to turn on the transistor ("1" state). On the other hand, there is no channel current if Gate oxide Breakdown is on the Source 320 side because the Gate 330 voltage is low, or the same as Source 320 voltage, to shut off the transistor 300, ("0" state).

In the case of FIG. 3A, where the breakdown happened to occur on the drain 325 side, when reading the encode transistor 300, a high channel current occurs, resulting in a read of a "1".

FIG. 3B, encode transistor 350 is used as an example. As with other example embodiments, encode transistor 350 includes a deep N-well 360, a P-well 355, an N+ drain region 375, an N+ source region 370, a gate oxide layer 390, and a gate electrode 380 formed on a P-substrate 365.

After following the above described four reading steps in the stipulated read bias conditions, the encode transistor 350 will read as a "0" because there is no channel current.

In short, a PUF of the prior art necessitated having a complicated sensing amplifier to compare the source side and drain side gate oxide leakage currents to determine whether a particular programmed encode transistor held a "1" or a "0" resulting in increased expense, circuitry complications, and increased chance or error.

To overcome these drawbacks, a PUF according to the invention uses a novel method of programming and reading the encode transistor. This is achieved by using a different path to read the encode transistor than was used to program the transistor. Turning on the bit enable transistor to couple the source and bit lines during the programming process provides the desired randomized programming to the encode transistor. Turning off the bit enable transistor during the read of the encode transistor allows the encode transistor to be read as a "1" or a "0", proving a clear advantage over the prior art's comparison of leakage current.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A semiconductor device comprising:
   at least a bit line and source line; and
   at least a physically unclonable function (PUF) unit cell coupled to the bit line and the source line, the PUF unit cell including an encode transistor, the encode transistor is a MOSFET that is electrically one-time programmable, a gate electrode of the MOSFET can be switched between ground and floating by a switching transistor;
   wherein a path programming the unit cell is different from a path reading the unit cell.

2. The device according to claim 1, wherein the MOSFET is programmed to "1" or "0" state randomly by rupturing an overlapping gate dielectric layer between the gate electrode of the MOSFET and a drain of the MOSFET or between the gate electrode of the MOSFET and a source of the MOSFET.

3. The device of claim 2, further comprising:
   an encode select transistor including a first terminal coupled to ground, a second terminal coupled to a control terminal of the MOSFET, and a control terminal coupled to an encode select line;
   a read select transistor including a first terminal coupled to the bit line and a control terminal coupled to a read select line; and
   the MOSFET further including a first terminal coupled to the source line and a second terminal coupled to a second terminal of the read select transistor.

4. The device of claim 3, wherein the MOSFET further includes an N+ drain region, an N+ source region, a gate oxide layer, and a gate electrode, formed on a P-substrate.

5. The device of claim 4, wherein the P-substrate includes a deep N-well and a P-well.

6. The device according to claim 4, wherein the gate electrode of the MOSFET can be switched between ground and floating by a switching transistor.

7. The device of claim 1, further comprising an encode enable transistor having a first terminal coupled to the source line, a second terminal coupled to the bit line, and a control terminal coupled to a program enable line.

8. The device of claim 7, further comprising:
   an encode select transistor including a first terminal coupled to ground, a second terminal coupled to a control terminal of the encode transistor, and a control terminal coupled to an encode select line;
   a read select transistor including a first terminal coupled to the bit line and a control terminal coupled to a read select line; and
   the encode transistor further including a first terminal coupled to the source line and a second terminal coupled to a second terminal of the read select transistor.

9. The device of claim 8, wherein the encode transistor further includes a deep N-well, a P-well, an N+ drain region, an N+ source region, a gate oxide layer, and a gate electrode and the encode transistor is formed on a P-substrate.

10. The device according to claim 9, wherein the gate electrode of the encode transistor can be switched between ground and floating by a switching transistor.

11. A method of programming a semiconductor device, the semiconductor device comprising:
    at least a bit line and source line;
    at least a physically unclonable function (PUF) unit cell, the PUF unit cell comprising:
    an encode select transistor having a first terminal coupled to ground (GND), a second terminal coupled to a control terminal of an encode transistor, and a control terminal coupled to an encode select line;
    the encode transistor further including a first terminal coupled to the source line, and a second terminal coupled to a first terminal of a read select transistor; and
    the read select transistor further including a second terminal coupled to the bit line, and a control terminal coupled to a read select line;
    the method comprising:
    applying a voltage to the encode select line to turn on the encode select transistor;
    applying a voltage to the read select line to turn on the read select transistor; and
    applying enough voltage to the bit line and the source line simultaneously to cause a breakdown of gate dielectric on top of either a drain or a source of the encode transistor.

12. The method of claim 11, wherein applying enough voltage to the bit line and the source line simultaneously to cause a breakdown of gate dielectric on top of either a drain or a source of the encode transistor is achieved by ramping up the bit line voltage from 0V to at least the breakdown voltage of the gate dielectric.

13. The method of claim 11, wherein applying enough voltage to the bit line and the source line simultaneously to cause a breakdown of gate dielectric on top of either a drain or a source of the encode transistor is achieved by applying at least the breakdown voltage of the gate dielectric to either the bit line or the source line.

14. The method of claim 11, wherein applying enough voltage to the bit line and the source line simultaneously is achieved by including an encode enable transistor having a first terminal coupled to the source line, a second terminal coupled to the bit line, and a control terminal coupled to a program enable line, and applying enough voltage to the program enable line and either the bit line or the source line to cause the breakdown of the gate dielectric on top of either the drain or the source of the encode transistor.

15. The method of claim 11, wherein the bias conditions during programming comprise:
applying 1-3V to the encode select line;
applying 3-10V to the read select line;
applying 3-10V to the bit line and the source line simultaneously or ramping up voltage applied to the bit line and the source line simultaneously from 0V to at least the breakdown voltage of the gate dielectric; and
floating the source line.

16. A method of reading a semiconductor device, the semiconductor device comprising:
at least a bit line and source line;
at least a physically unclonable function (PUF) unit cell, the PUF unit cell comprising:
an encode select transistor having a first terminal coupled to ground (GND), a second terminal coupled to a control terminal of an encode transistor, and a control terminal coupled to an encode select line;
the encode transistor further including a first terminal coupled to the source line, and a second terminal coupled to a first terminal of a read select transistor; and
the read select transistor further including a second terminal coupled to the bit line, and a control terminal coupled to a read select line;
the method comprising:
applying a voltage to the encode select line to turn off the encode select transistor;
electrically decoupling the bit line from the source line; and
applying a voltage to the read select line to turn on the read select transistor.

17. The method of claim 16, wherein the bias conditions during a read comprise:
applying 1-3V to the read select line;
applying 0.5-2V to the bit line; and
applying 0V to the source line.

* * * * *